(12) United States Patent
Vasudevan et al.

(10) Patent No.: US 12,199,845 B2
(45) Date of Patent: Jan. 14, 2025

(54) METHOD, DEVICE AND COMPUTER PROGRAM FOR COLLECTING LOGS IN AN EDGE-NETWORK

(71) Applicant: BULL SAS, Les Clayes-sous-bois (FR)

(72) Inventors: Vinod Vasudevan, Fairfax, VA (US); Ravi Raman, Bangalore (IN)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 18/356,447

(22) Filed: Jul. 21, 2023

(65) Prior Publication Data

US 2024/0073114 A1    Feb. 29, 2024

(30) Foreign Application Priority Data

Aug. 27, 2022    (EP) .................................... 22306270

(51) Int. Cl.
| | |
|---|---|
| *H04L 29/08* | (2006.01) |
| *H04L 29/06* | (2006.01) |
| *H04L 43/04* | (2022.01) |
| *H04L 61/5007* | (2022.01) |
| *H04L 9/08* | (2006.01) |

(52) U.S. Cl.
CPC .......... *H04L 43/04* (2013.01); *H04L 61/5007* (2022.05)

(58) Field of Classification Search
CPC ..... H04L 43/04; H04L 61/5007; H04L 29/08; H04L 9/08; H04L 29/06; H04L 9/088; H04L 9/0819
USPC ....................................................... 709/224
See application file for complete search history.

(56) References Cited

U.S. PATENT DOCUMENTS

| | | | |
|---|---|---|---|
| 2019/0158594 A1* | 5/2019 | Shadmon | H04L 67/01 |
| 2019/0265996 A1* | 8/2019 | Shevade | G06F 9/45558 |
| 2021/0133079 A1* | 5/2021 | Kannan | H04L 9/3239 |
| 2021/0303270 A1* | 9/2021 | Liu | G06F 8/30 |

FOREIGN PATENT DOCUMENTS

EP    3140734 A1    3/2017

OTHER PUBLICATIONS

European Search Report and Written Opinion issued in EP22306270.4, dated Jan. 13, 2023.
Asad, et al., "IoTEF: A federated Edge-Cloud Architecture for Fault-Tolerant IOT Applications", Journal of Grid Computing, Springer, Netherlands, Dordrecht, vol. 18, No. 1, Jan. 10, 2020.

* cited by examiner

*Primary Examiner* — Jude Jean Gilles
(74) *Attorney, Agent, or Firm* — ARC IP Law, PC; Joseph J. Mayo

(57) ABSTRACT

The invention relates to an edge-based log collecting device for collecting logs from several log sources located in a remote network, called edge-network, and sending the logs to a cloud-based system distant from the edge-network. The device is located in the edge-network, and the device includes several processing nodes for processing logs received from the log sources and sending them to said the system. The device is configured to elect, according to a predetermined election algorithm, one of the processing nodes as a master node configured for receiving the logs from all log sources of the local network, and sharing the logs with the other processing nodes. The invention further relates to a computer program and a device configured to carry out such a method.

13 Claims, 2 Drawing Sheets

METHOD, DEVICE AND COMPUTER PROGRAM FOR COLLECTING LOGS IN AN EDGE-NETWORK

This application claims priority to European Patent Application Number 22306270.4, filed 27 Aug. 2022, the specification of which is hereby incorporated herein by reference.

BACKGROUND OF THE INVENTION

Field of the Invention

At least one embodiment of the invention relates to a device for collecting logs in an edge-network. At least one embodiment of the invention also relates to a method for collecting logs in an edge-network, and a computer program for carrying out such a method. At least one embodiment of the invention also relates to an edge-network implementing such as device, a method or a computer program.

The field of the invention is the field of collecting logs in edge networks, or in other words the field of edge-based log collection solutions, especially for cybersecurity purposes.

Description of the Related Art

In the cybersecurity landscape, there is a need to collect and process logs from log sources, also called security devices, to determine security issues in the networks, such as company networks. In a SaaS model, the collection of logs from different log sources is done by a log collector arranged in the network concerned by the logs: such a log collector is also called an edge-based log collector. This log collector collects/receives the logs from log sources of the network, such as firewalls in said network, end-point protection systems (EPP), proxies, etc. The edge based log collectors compress the logs, encrypt and send them to the cloud system where it is uncompressed, unencrypted to process the logs for detection of attacks in the network, and more generally for cybersecurity concerns. Hence, such log sources have to be resilient. Plus the log collector has to process high volume of logs without dropping any log. In practice, such log processing systems have main issues.

First, when the edge-based log collector implemented in the network is down, no log flow can be achieved. Thus, with the current log collectors it is not possible to achieve an uninterrupted log flow from the log sources to the cloud system.

Second, it may happen that the edge-based log collector is reconfigured, for example said log collector is down, or in case of maintenance, or even in case of reconfiguration of the network. With the current solutions, it is mandatory to reconfigure all the log sources in the network so that said log sources send the logs to said new log collector. Such a reconfiguration is cumbersome and time consuming, and prevents continuous log flow towards the cloud system.

Moreover, current log collectors are not able to process high volumes of logs. The current techniques use load balancers, or routing servers, placed upstream the log collector. This technique, in addition to not being an efficient solution for high volume log processing, creates a bottleneck for log flow.

A purpose of at least one embodiment of the invention is to overcome at least one of these drawbacks.

Another purpose of at least one embodiment of the invention is to provide a more efficient solution for edge-based log collection, regarding at least one of the drawbacks mentioned above.

Another purpose of at least one embodiment of the invention is to provide a solution for edge-based log collection that allows a less cumbersome and time consuming modification of the log collector implemented in the network.

Another purpose of at least one embodiment of the invention is to provide a more robust solution for edge-based log collection that ensures an improved availability for log flow.

Another purpose of at least one embodiment of the invention is to provide a solution for edge-based log collection capable of efficiently processing high volumes of logs.

BRIEF SUMMARY OF THE INVENTION

One or more embodiments of the invention makes it possible to achieve at least one of these aims by an edge-based log collecting device for collecting logs from several log sources located in a remote network, called edge-network, and sending said logs to a cloud-based system distant from said edge-network, said device being located in said edge-network, the device comprising:
- at least one interface for receiving logs from said log sources,
- at least one interface for sending logs to said distant system, and
- several processing nodes for processing the received logs and sending them to said system;

the device is, and more particularly the processing nodes are, configured to elect, according to a predetermined election algorithm, one of the processing nodes as a master node configured for:
- receiving the logs from all log sources of the local network, and
- sharing said logs with the other processing nodes.

At least one embodiment of the invention thus proposes a log collecting device for collecting logs in an edge-network, located in the edge-network. The log collecting device collects logs from the log sources located in the edge-network. Moreover, the device according to one or more embodiments of the invention comprises several processing nodes for processing the logs collected, or received, from log sources. Thus the device according to one or more embodiments of the invention is capable of efficiently processing high volumes of logs.

Moreover, the device, and more particularly the processing nodes, is/are configured to elect one of the processing nodes as a master node that receives the logs from the log sources of the edge-network. Thus it is possible to elect any one of the processing nodes as the master node, at the start of the device, and any time during use of the device according to one or more embodiments of the invention. Thus, the invention according to at least one embodiment of the invention allows a better availability for log flow. Indeed, at least one embodiment of the invention makes it possible to elect a new master node, when the current master node is down or unavailable, to ensure improved, and mode particularly continuous, log flow from the log sources towards the cloud system.

Furthermore, by way of one or more embodiments, since the master node may be changed easily and the device according to at least one embodiment of the invention comprises several processing nodes, each of which may be elected as the master node, at least one embodiment of the invention proposes a more efficient solution for edge-based log collection.

According to one or more embodiments, at least one, and in particular each, processing node may be configured to compress the logs, and/or encrypt and/or send it to the cloud system.

Of course, at least one, and in particular each, processing node may be configured to carry out another function, or processing, as those mentioned above.

According to one or more embodiments, at least two, and in particular all, of the processing nodes may carry out log processing in parallel, simultaneously or one after the other.

According to one or more embodiments, at least one, and in particular each, of the processing nodes may be a physical machine or a virtual machine.

For example, at least one, and in particular each, of the processing nodes may be a computer, a processor, a chip, a gateway, etc.

In one or more embodiments, the processing nodes may be configured to switch the master node according to the election algorithm.

Thus, the master node may be changed any time, for example during use of the device.

The switch of the master node may comprise an election of another processing node as the new master node. The current master node may then become a processing node, if said node is still available.

The switch of the master node may be done upon request, or when the current master node is down or unavailable, or at a given frequency.

In one or more embodiments, the processing nodes may be configured to elect one of the processing nodes as the master node at the start of the device. In this case, when the device is started a master node is elected before the logs are collected and processed by the device according to at least one embodiment of the invention.

Alternatively, in one or more embodiments, at the start of the device, the master node may be selected in a different manner, for example by an operator or by a configuration data, or randomly among the processing nodes.

According to one or more embodiments, when the current master node is unavailable or is down, the processing nodes may be configured to elect one of the remaining available processing nodes as the master node, according to the election algorithm.

Thus, the device according to at least one embodiment of the invention ensures high availability and continuous log flow from the log sources to the could system.

In one or more embodiments, the device according to at least one embodiment of the invention may comprise an odd number of processing nodes equal to, or greater than, three.

Such an odd, or uneven, number of nodes makes it easier to elect the master node.

According to one or more embodiments, a new master node may be elected among the remaining available nodes, if the number of the remaining available processing nodes is greater than, or equal to, a predefined threshold.

The threshold thus defines a minimum number of available processing nodes, in order to elect a new master node. If the number of remaining available processing nodes is smaller than the threshold, the device may be stopped and no new master node may be elected.

The threshold, also called quorum, and noted Q, may be established based on a strict majority of the processing nodes in the device according to at least one embodiment of the invention, at the start of said device. When the number of the processing nodes of the device is N, for example an odd number greater or equal to 3, the quorum Q may be $Q=N/2+1$. For example, if $N=3$, the quorum is equal to 2 and if $N=5$, the quorum is equal to 3.

According to one or more embodiments, the election algorithm may be any type of election algorithm.

For example, in at least one embodiment, the election algorithm may be a random voting algorithm in which each available processing node votes for another available processing node, except itself.

According to one or more embodiments, a floating public IP address may be associated to the master node so that when a processing node is elected as the master node said public IP address is assigned to said processing node.

Thus, the public IP address remains unchanged for the log sources even when the master node is changed/switched in the device according to at least one embodiment of the invention. More particularly, the public floating IP address is bound to the master node at the start of the device. When the master node is switched from one of the processing node to another one of the processing node, the floating IP address is assigned and associated to said new processing node that becomes the master node. The log sources continue sending the logs to the same floating public IP address. The logs are received by the device and always routed to the processing node acting as the master node, regardless the processing node that is currently the master node.

In other words, in at least one embodiment, the change of the master node is totally transparent for the log sources. There is no need to change the IP address of the master node at the level of each log source. Thus at least one embodiment of the invention proposes a solution for edge-based log collection that allows a less cumbersome and time consuming modification regarding the log collector implemented in the network.

The assignment of the floating public IP address from one of the processing node to another processing node may be done with appropriate infrastructure APIs.

According to one or more embodiments of the invention, the processing nodes, including the master node, may be organized as a cluster in which a private IP address is assigned to each of said processing node, said private IP addresses being used by said processing nodes to communicate with each other, and in particular for processing load balancing.

Thus, the master node receives the logs from the log sources, for example through the public floating IP address. When the logs are received, they may be distributed among the processing nodes of the device, through the private IP addresses associated to said processing nodes, organized as a cluster. Thus, at least one embodiment of the invention proposes a solution for edge-based log collection capable of efficiently processing high volumes of logs, since the processing loads may be balanced between several processing nodes, in an efficient manner.

For example, a load balancing agent, such as Apache Nifi technology agent, may be used in the device according to one or more embodiments of the invention, and more particularly in each processing node, in order to implement load balancing. This ensures that there will be no need to run a separate front end load balancer, thus reducing costs and added complexity associated to such a front-end component itself.

According to at least one embodiment of the invention, it is proposed a method for collecting logs from several log sources located in a remote network, called edge-network, and sending the logs to a cloud-based system distant from the edge-network, with a log collecting device located in the edge-network, the device comprising:

at least one interface for receiving logs from the log sources, at least one interface for sending logs to the distant system, and several processing nodes for processing the received logs and sending them to the system;

the method comprising a step of electing, according to an election algorithm, one of said processing nodes as a master node configured for:

receiving the logs from the log sources, and sharing the logs with the other processing nodes.

In addition to the features recited here, the method according to at least one embodiment of the invention may comprise at least one, or a combination of at least two, of the optional features recited above in connection with the device according to the one or more embodiments of the invention. The method according to at least one embodiment of the invention provides the same advantages/benefits, and responds to the same drawbacks, as those mentioned above for the device according to one or more embodiments of the invention.

In one or more embodiments, the method according to at least one embodiment of the invention may further comprise at least one iteration of a step for switching the master node from one of the processing nodes to another one of the processing nodes.

In this case, a new processing node may be elected as the new master node, for example according to the election algorithm. The processing node that is the current master node will no longer be the master node and will be used as a processing node, if it is still available.

The switching step may be carried any time during use of the device.

The switching step may be carried out upon request.

The switching step may be carried out at a given frequency.

In one or more embodiments, the switching step may be carried out when the current master node is unavailable, or down, the new master node being elected among the remaining available processing nodes.

Thus, the method according to at least one embodiment of the invention allows continuous log collection and continuous log flow, even when the current master node is down.

In one or more embodiments, a floating public IP address may be associated to the master node and used by the log sources to communicate with said master node. In one or more embodiments, when a processing node is elected as master node the method according to at least one embodiment of the invention may comprise a step for assigning said floating public IP address to said processing node.

Thus, there is no need to change the address to which the log sources send the logs when the master node is changed, as explained above in connection with the device according to at least one embodiment of the invention.

According to one or more embodiments, the processing nodes, including the master node, may be organized as a cluster.

In this case, the method may comprise a step for assigning a private IP address to each of said processing node, said private IP addresses being used by said processing nodes to communicate with each other.

According to at least one embodiment of the invention, it is proposed a computer program comprising instructions, which when executed by a computer, cause the computer to carry out the steps of the method according to one or more embodiments of the invention.

The computer program may be in any programming language such as C, C++, JAVA, Python, etc.

The computer program may be in machine language.

The computer program may be stored, in a non-transient memory, such as a USB stick, a flash memory, a hard-disk, a processor, a programmable electronic chop, etc.

The computer program may be stored in a computerized device such as a Smartphone, a tablet, a computer, a server, etc.

According to at least one embodiment of the invention, it is proposed an edge-network comprising several log sources, the network also comprising:

a device according to the invention, or means configured for carrying out the steps of the method according to one or more embodiments of the invention;

for collecting logs from the log sources.

In other terms, at least one embodiment of the invention also concerns an edge-network implementing the device, the method and/or the computer program according to one or more embodiments of the invention.

The edge-network according may be any kind of edge-network, such as a company network for example.

BRIEF DESCRIPTION OF THE DRAWINGS

Other advantages and characteristics will become apparent on examination of the detailed description of at least one embodiment of the invention which is in no way limitative, and the attached figures, where.

DETAILED DESCRIPTION OF THE INVENTION

It is well understood that the one or more embodiments that will be described below are in no way limitative. In particular, it is possible to imagine variants of the one or more embodiments of the invention comprising only a selection of the characteristics described hereinafter, in isolation from the other characteristics described, if this selection of characteristics is sufficient to confer a technical advantage or to differentiate the one or more embodiments of the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the FIGURES, elements common to several figures retain the same reference.

Figure 1:
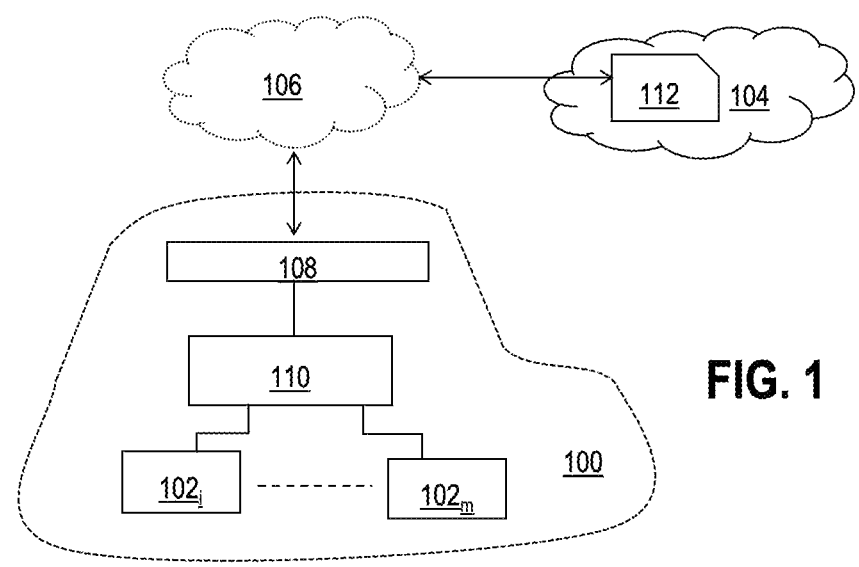
FIG. 1 is a diagrammatic representation of a non-limitative example of an edge-network according to one or more embodiments of the invention.

FIG. 1 is a diagrammatic representation of a non-limitative example of an edge-network according to one or more embodiments the invention.

The edge-network 100, also called the network 100 in the following, shown in FIG. 1, may be any kind of edge-network. The network 100 may be a company network, for example.

The network 100 may be a local network, or a network distributed among several locations/sites.

The network 100 comprises several log sources. In the example shown in FIG. 1, the network comprises M log sources $102_1$-$102_m$, located in said network 100. The log sources may be designated with the references $102_i$ or 102 in the following.

The network 100 is connected to the cloud 104, for example through a communication network 106, such as for example the Internet. In this regard, the network comprises a gateway 108 that connects the network 100 to the Internet 106.

The network 100 also comprises a device 110 according to at least one embodiment of the invention, for collecting the logs from the log sources and sending the same to a system 112 located in the cloud 104. An example of a device 110 will be described in the following with reference to FIG. 2.

The log sources 102 may be devices such as firewalls, end-point protection systems (EPP), proxies, etc.

Of course, the network 100 comprises other components such as servers, user devices, etc. that are not shown in FIG. 1.

Figure 2:
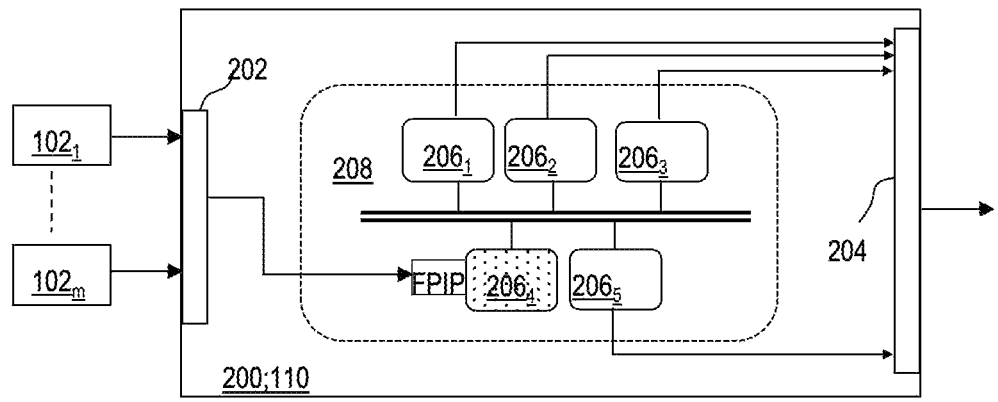
FIGS. 2 and 3 are diagrammatic representations of a non-limitative example of a device according to one or more embodiments of the invention.
Figure 3:
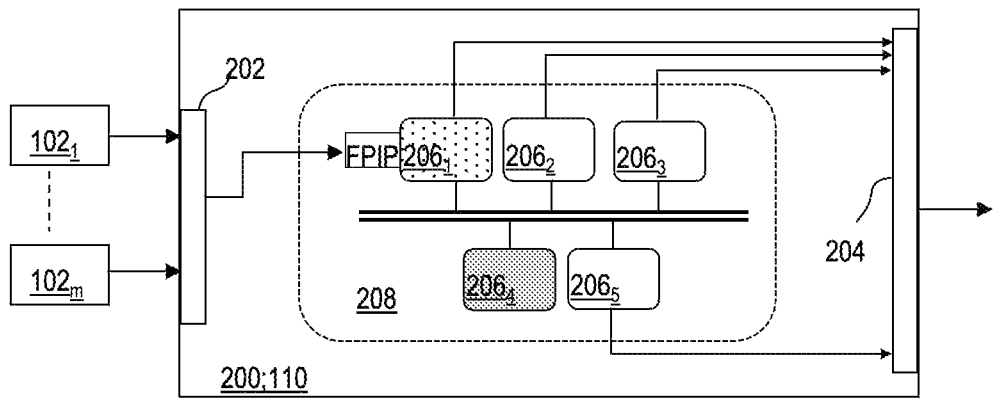

FIGS. 2 and 3 are diagrammatic representations of a non-limitative example of a device according to one or more embodiments of the invention for collecting logs.

The device 200, shown in FIGS. 2 and 3, may be used in any edge-network, and especially in the edge-network 100 of FIG. 1.

The device 200 may be the log collecting device 110 of FIG. 1.

The device 200 comprises at least one communication interface 202 for receiving the logs from the log sources $102_i$.

The device 200 comprises at least one communication interface 204 for sending the logs to the cloud system 114, through the gateway 108 (not represented in FIGS. 2 and 3).

The device 200 comprises several processing nodes, for example N processing nodes. In the example shown in FIGS. 2 and 3, N=5. The processing nodes, PN, $206_1$-$206_5$ may be designated with the references $206_i$ or 206 in the following.

The PN $206_1$-$206_5$ are organized as a cluster 208. Moreover, each processing node $206_i$ is assigned a private IP address. Thus, the processing nodes $206_1$-$206_5$ may communicate with each other in the cluster 208 so that log processing load may be balanced between the PN $206_1$-$206_5$ very efficiently and transparently.

Each PN $206_i$ may comprise a load balancing agent, such as an Apache Nifi agent, to balance load between the PN $206_1$-$206_5$, thus avoiding use of an additional component in the device 200 for load balancing between the nodes $206_1$-$206_5$.

According to at least one embodiment of the invention, the PNs $206_1$-$206_5$ are configured to elect one of the PNs $206_1$-$206_5$, as the master node. To do so, each PN $206_i$ comprises an electing agent in order to vote for one of the other PNs, according to an election algorithm.

The election algorithm may be any type of election algorithm. For example, the election algorithm may be a random voting algorithm in which each available processing node votes for another available processing node, except itself.

The election of the master node may be carried at the start of the device.

The election of the master node may also be carried out each time the current master node is down or unavailable.

According to one or more embodiments, a master node may be elected among the remaining available nodes, if the number of the remaining available processing nodes is greater than, or equal to, a predefined threshold, also called quorum, Q.

In a non-limitative example, the quorum may be established based on a strict majority of the processing nodes in the device 200. In this case, Q=3 in the example shown in FIGS. 2-3.

Thus, one of the PN $206_1$-$206_5$ is chosen as the master node.

The master node is configured to:
receive the logs from all log sources $102_1$-$102_m$, and
share said logs with the other processing nodes PN $206_i$, in order to balance load for example by using the Apache Nifi agent and the private IP addresses of the PNs $206_i$.

According to at least one embodiment of the invention, a floating public IP address, referenced FPIP, is associated to the master node so that when a processing node is elected as the master node said floating public IP address is assigned to said processing node. This floating public IP address is the one already assigned to the log sources $102_1$-$102_m$, hence there will be no need to communicate it to the log sources $102_1$-$102_m$ when the processing node is elected as the master node.

The floating public IP address FPIP remains unchanged when the master node is changed/switched in the device 200. In other words, the public floating IP address FPIP is bound to the master node at the start of the device. When the master node is switched from one of the processing nodes $206_i$ to another one of the processing nodes $206_i$, the floating IP address is assigned and associated to said new processing node that becomes the master node. The log sources 102 continue sending the logs to said floating public IP address. The logs are received by the device 200 and are always routed to the master node, for example by the interface 202, regardless the change of the processing node acting as the master node.

The assignment of the floating public IP address FPIP from one of the processing nodes $206_i$ to another one of the processing nodes $206_1$-$206_5$ may be done with appropriate network infrastructure APIs.

For example, by way of at least one embodiment, in the example shown in FIGS. 2-3, the PN $206_4$ is chosen as the master node, at the start of the device 200, as shown in FIG. 2. The floating IP address FPIP is assigned to the processing node $206_4$, for example by inscription in the API used in the device 200, or in the cluster 208, or in the interface 202.

When the PN $206_4$ acting as the master node is down, or unavailable, the remaining processing nodes $206_1$-$206_3$ and $206_5$ elect a new master node among the remaining available processing nodes $206_1$-$206_3$ and $206_5$. For example, the processing node $206_1$ is elected to be the new master node, as shown in FIG. 3, by way of at least one embodiment. Using the network level API calls that the network supports, the FPIP, previously assigned to the processing node $206_4$, is assigned to the processing node $206_1$ elected as the new master node. The PN $206_4$ is unavailable and does not participate in the election of the new master node, nor in the log processing. The log sources 102 continue sending logs to the floating public IP address FPIP, now assigned to the PN $206_1$ acting as the master node.

At least one, and in particular each, of the processing nodes $206_i$ may be a physical machine or a virtual machine, by way of one or more embodiments. For example, at least one, and in particular each, of the processing nodes $206_i$ may be a computer, a processor, a chip, gateway, etc.

At least one, in particular each, processing node $202_i$ is configured to compress the logs, encrypt the logs and send the compressed encrypted logs to the cloud system 114, through the interface 204.

The processing nodes $206_i$ may process logs simultaneously or in turn.

Of course, at least one, and in particular each, processing node $206_i$ may be configured to carry out another function, or processing, as those mentioned above.

Figure 4:
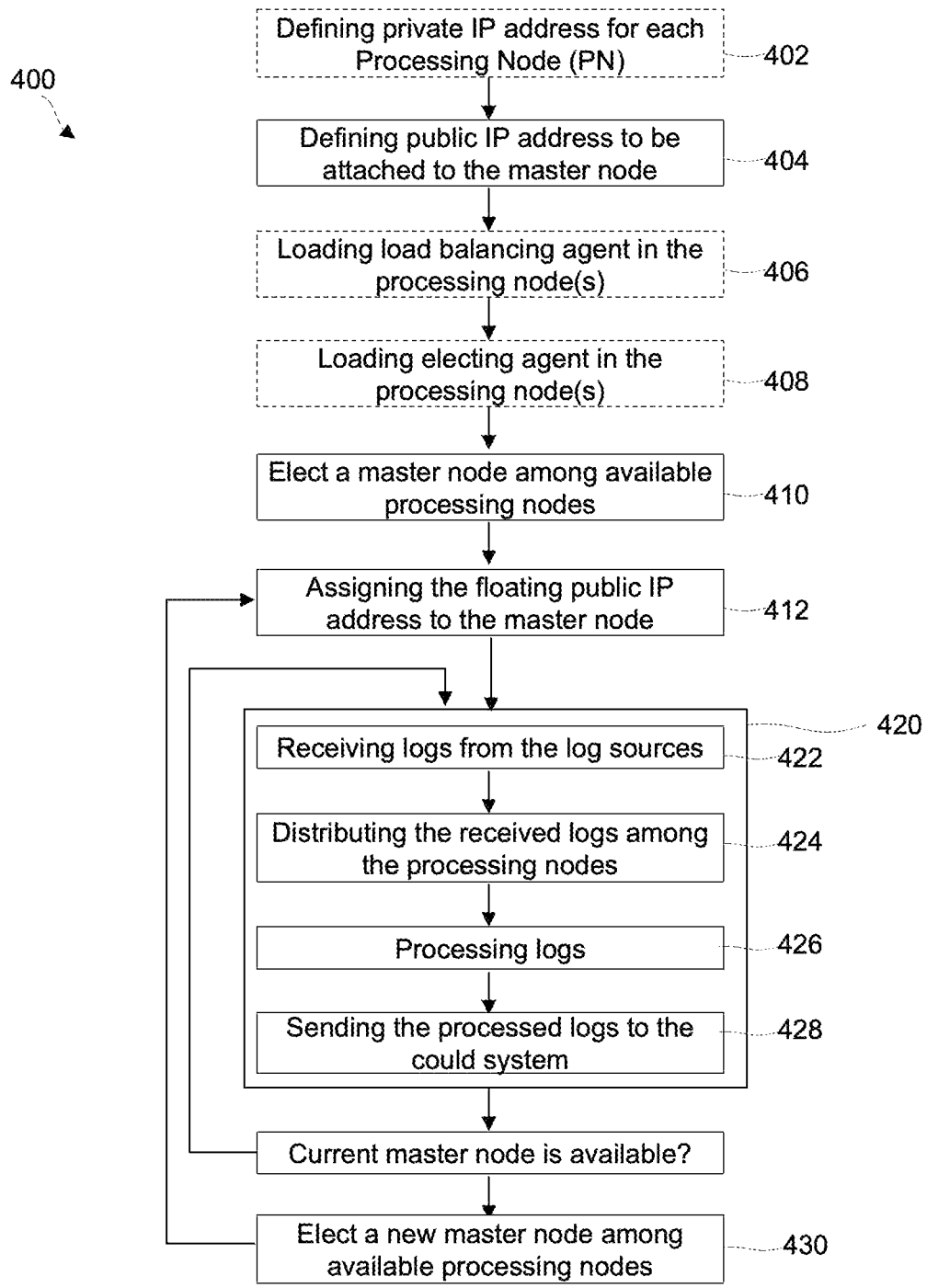
FIG. 4 is a diagrammatic representation of a non-limitative example of a method according to one or more embodiments of the invention.

FIG. 4 is a diagrammatic representation of a non-limitative example of a method according to one or more embodiments of the invention.

The method 400, shown in FIG. 4, may be used in any kind of edge-network for collecting logs, and more particularly in the edge-network 100 of FIG. 1.

The method 400 may be carried out with a device according to at least one embodiment of the invention, and more particularly with the device 200 of FIGS. 2-3.

The method 400, by way of one or more embodiments, may comprise an optional step 402 for defining a private IP address for each of the processing node of the device, i.e. for the PN $206_1$-$206_5$. The private IP addresses are used by the PNs to communicate with each other, and more particularly by the master node to communicate with the other PNs, especially for processing load balancing. This step 402 is optional because the private IP addresses may be defined in the processing nodes beforehand.

The method, in at least one embodiment, comprises a step 404 for defining a floating public IP address FPIP that will be attached to the master node. This floating public IP address FPIP is communicated to each log source so that each log source sends the log(s) to said address.

The method 400, by way of one of more embodiments, further may comprise an optional step 406 for loading in at least one, and especially in each, processing node a load balancing agent, such as the Apache Nifi agent. This step 406 is also optional because the load balancing agent(s) may be loaded in the processing nodes beforehand.

The method 400 may further comprise an optional step 408 for loading in at least one, and especially in each, processing node an electing, or a voting, agent, for electing a master node among the processing nodes of the device. This step 408 is also optional because the electing agent(s) may be loaded in the processing nodes beforehand.

The method 400 further comprises, in at least one embodiment, a step 410 for electing a master node. The election of the master node may be done as described above, for example according to an election algorithm.

At a step 412, the floating public IP address is assigned to the processing node elected as the master node, for example by assigning said floating public IP address to said node in a device's API.

After the master node is elected and the floating public IP address attached to the master node is assigned to the processing node acting as master node, the method 400 comprises a processing phase 420.

The processing phase comprises a step 422 during which the master node receives logs from log sources, by way of at least one embodiment.

The received logs are distributed, by the master node, among all the processing nodes of the device, at a step 424.

Each processing node processes the logs it received from the master node at a step 426 of the processing phase 412. The master node may also process part of the logs so that the logs are balanced among all of the available processing nodes, including the master node. For example, the logs may be compressed, and/or encrypted.

At a step 428, each processing node sends the logs it processed to the cloud system.

The processing phase 412 is repeated as long as the current master node is available, and as long as logs are received.

If the current master node is down or unavailable, the system comprises a step 430 electing a new master node among the available processing nodes, in a similar way as the step 410.

Once the new master node is elected, the process resumes to step 412 where the floating public IP address is assigned to the processing node elected as the new master node.

The method then continues to the processing phase 420 with the new master node, and so on.

Of course the method according to one or more embodiments of the invention is not limited to the example described above in connection with the FIG. 4. For example, steps 402-410 in a different order than the one shown in FIG. 4. Moreover, steps 422-428 are shown as discrete steps. In one or more embodiments, each of the steps 422-428 may be a continuous step carried out continuously throughout the processing step. In one or more embodiments, step 430 may be carried out on demand, or at a given frequency, instead of or in addition to, what has been described above.

Of course, the one or more embodiments of the invention are not limited to the examples detailed above. For example, the number of the log sources, the number of the processing nodes, their arrangement, etc. are not limited to the examples described above.

What is claimed is:

1. An edge-based log collecting device that collects logs from several log sources located in a remote network, wherein said remote network comprises an edge-network, and sends said logs to a cloud-based system distant from said edge-network, wherein said edge-based log collecting device is located in said edge-network, and wherein said edge-based log collecting device comprises:
   at least one interface that receives said logs from said several log sources,
   at least one second interface that sends said logs to said cloud-based system, and
   several processing nodes that process the logs that are received and sends them to said cloud-based system;
   wherein said edge-based log collecting device is configured to elect, according to a predetermined election algorithm, one processing node of said several processing nodes as a master node that is configured to
   receive the logs from all of said several log sources of the edge-network, and
   share said logs with other processing nodes of the several processing nodes.

2. The edge-based log collecting device according to claim 1, wherein the several processing nodes are configured to switch the master node according to the predetermined election algorithm.

3. The edge-based log collecting device according to claim 1, wherein, when the master node that is elected is unavailable, the several processing nodes are configured to elect one of the other processing nodes as the master node, according to the predetermined election algorithm.

4. The edge-based log collecting device according to a claim 1, wherein said several processing nodes are an odd number equal to, or greater than, three.

5. The edge-based log collecting device according to claim 1, wherein a floating public IP address is associated to the master node such that when said one processing node is elected as the master node said floating public IP address is assigned to said one processing node.

6. The edge-based log collecting device according to claim 1, wherein the several processing nodes, including the master node, are organized as a cluster in which a private IP address is assigned to each processing node of said several processing nodes, and wherein said private IP address of each processing node is used by said several processing nodes to communicate with each other.

7. A method for collecting logs from several log sources located in a remote network, wherein said remote network comprises an edge-network, and sending said logs to a cloud-based system distant from said edge-network, with a log collecting device located in said edge-network, wherein said log collecting device comprises
   at least one interface that receives said logs from said several log sources,
   at least one second interface that sends said logs to said cloud-based system, and
   several processing nodes that process the logs that are received and sends them to said cloud-based system;
said method comprising:
   electing, according to an election algorithm, one processing node of said several processing nodes as a master node that
      receives the logs from said several log sources, and
      shares said logs that are received with other processing nodes of said several processing nodes.

8. The method according to claim 7, further comprising switching the master node from one of the several processing nodes to another one of the several processing nodes as a new master node.

9. The method according to claim 8, wherein the switching is carried out when the master node that is elected is unavailable, such that the new master node is elected among remaining available processing nodes of the several processing nodes.

10. The method according to claim 7, further comprising assigning a floating public IP address to the master node that is elected and wherein the floating public IP address is used by the several log sources to communicate with said master node, and in that when said one processing node is elected as said master node said method assigns said floating public IP address to said one processing node.

11. The method according to claim 7, wherein the several processing nodes, including the master node, are organized as a cluster, and wherein said method further comprises assigning a private IP address to each processing node of said several processing nodes, wherein said private IP address of each of said several processing nodes is used by said several processing nodes to communicate with each other.

12. The method according to claim 7, wherein said method is configured to be executed by a non-transitory computer program comprising instructions which, when said instructions are executed by a computer, cause the computer to carry out the method.

13. An edge-network comprising:
   several log sources; and, an edge-based log collecting device that collects logs from said several log sources and sends said logs to a cloud-based system distant from said edge-network, wherein said edge-based log collecting device comprises
      at least one interface that receives said logs from said several log sources,
      at least one second interface that sends said logs to said cloud-based system, and several processing nodes that process the logs that are received and sends them to said cloud-based system;
      wherein said edge-based log collecting device is configured to elect, according to a predetermined election algorithm, one processing node of said several processing nodes as a master node that is configured to
         receive the logs from all of said several log sources of the edge-network, and
         share said logs with other processing nodes of the several processing nodes.

* * * * *